(No Model.)
A. R. HYNSON.
BARREL HEATER.
No. 284,018. Patented Aug. 28, 1883.
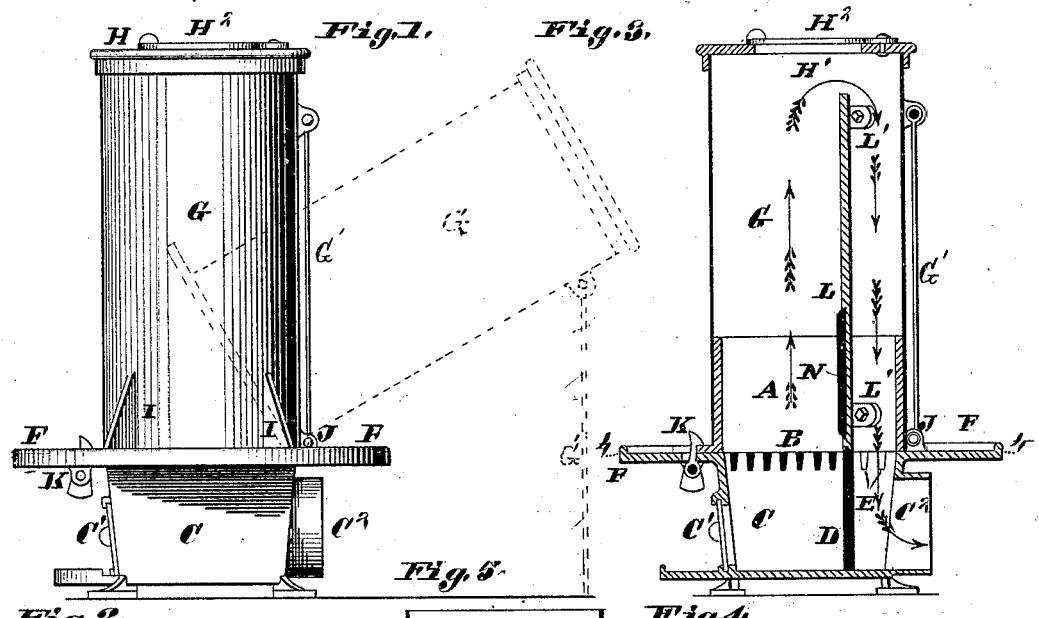
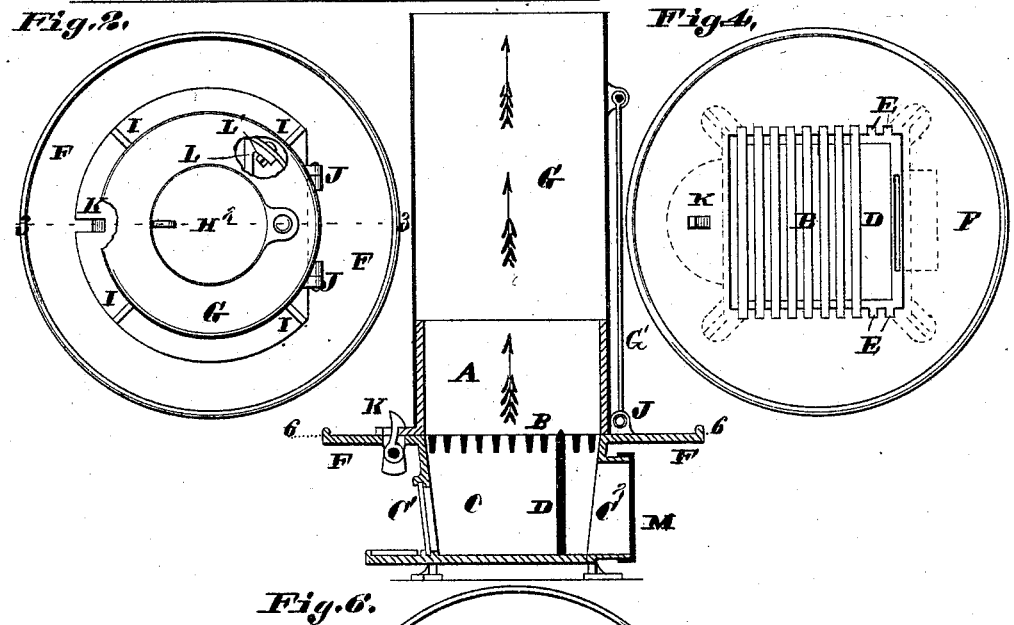
Attest:
Charles Pickles
Albert G. Fisk
Inventor:
Augustus R. Hynson
By Knight Bros
attys

UNITED STATES PATENT OFFICE.

AUGUSTUS R. HYNSON, OF ST. LOUIS, MISSOURI.

BARREL-HEATER.

SPECIFICATION forming part of Letters Patent No. 284,018, dated August 28, 1883.

Application filed April 19, 1883. (No model.)

*To all whom it may concern:*

Be it known that I, AUGUSTUS R. HYNSON, of the city of St. Louis, in the State of Missouri, have invented a certain new and useful Improvement in Barrel-Heaters, of which the following is a full, clear, and exact description, reference being had to the accompanying drawings, forming part of this specification, and in which—

Figure 1 is a side elevation, indicating by broken lines the position of the drum when swung to one side and resting upon a supporting-leg; Fig. 2, a top view; Fig. 3, a vertical section taken on line 3 3, Fig. 2. Fig. 4 is a horizontal section taken on line 4 4, Fig. 3. Fig. 5 is a vertical section taken on line 5 5, Fig. 6, showing the heater when used with an updraft. Fig. 6 is a horizontal section taken on line 6 6, Fig. 5.

My invention relates to a barrel-heater for coopers' use; and my invention consists in features of novelty hereinafter fully described, and pointed out in the claims.

Referring to the drawings, A represents the fire-box; B, the grate-bars, and C the ash-pit, having an opening provided with a door or damper, C', through which the ashes may be removed, and through which air is admitted for combustion of the fuel, and it is also provided with an exit, $C^2$, with which a draft-pipe may be connected. The ash-pit is also provided with a stationary vertical partition, D, which divides it into two parts, as shown.

The grate-bars B consist of removable strips, which rest in notches E in the upper edge of the ash-pit, and the upper edge of the ash-pit is provided with an annular flange or rim, F, on which the barrel being heated rests.

The fire-box is preferably made of cast-iron, and has fitting snugly over it a sheet-metal drum, G, having a top, H, with an opening, H', provided with a door, $H^2$, so that it can be closed when desired, as hereinafter explained.

Secured to or formed upon the bottom of the drum or cylinder are fixed triangular guides I, which the barrel strikes, and by them is adjusted to a concentric position with the heating-drum, so that the barrel will be heated evenly and not burned in one place and poorly heated in another.

The fire-box is pivoted to the ash-pit by means of hinges J, so that it and the drum can be tipped back into the position shown in dotted lines, Fig. 1, for the purpose of giving easy means for removing cinders, &c., from the grate-bars.

The drum has a pivoted leg, G', secured near its top to support it in its tilted position, and when in its natural position the drum is held from being accidentally tipped over by a catch, K, pivoted to the flange F of the ash-pit. (See Figs. 3 and 5.)

The drum and ash-pit are provided with a removable vertical partition, L, secured by bolts L' or other suitable means, which forms an extension of the partition D; and I prefer to make a "V-joint" between them, as shown. N represents a strip or piece of fire-clay, asbestus, or other suitable material, to protect the partition L against the heat of the fire. I prefer to secure the plate or strip by dovetailing it into the partition, being slid in horizontally before the partition is put into the heater; but it may be secured in any suitable way. The apparatus may of course be made of any desired size or shape to correspond with the size and shape of the barrel or keg to be heated.

M represents a cap to cover the exit $C^2$ when desired. (See Fig. 5.)

In using the apparatus, fuel is placed in the fire-box through the opening H' (by turning the cover $H^2$) and the fire started, the products of combustion passing, as shown by arrows, Fig. 3, upward over the top of the partition L and down on the other side of the partition to the exit $C^2$, and from there into the escape-pipe. The grate-bars back of the partition would preferably be removed. After the fire is thus started, or before, for that matter, the barrel to be heated is placed over the cylinder or drum, and guided and held concentrically therewith by means of the plates I. By means of the partition L the heat and products of combustion are made to pass up to the top of the apparatus, thereby heating it thoroughly throughout.

Now, instead of having the draft through the exit $C^2$, the apparatus may be placed (as is often convenient) beneath a flue, and the draft be upward only, in which case the partition L and top H would be removed, the grates B back of the partition replaced, and the cap M placed over the exit $C^2$, (see Fig. 5,) thus securing an open barrel-heater.

I claim as my invention—

1. In a barrel-heater, the combination of a drum or cylinder having triangular guides secured to the base thereof and a drum and barrel-supporting flange, as set forth.

2. In a barrel-heater, the combination of a drum or cylinder having a fire-box at the bottom within the same, and triangular barrel-guides, and a barrel-supporting flange, the drum or cylinder being hinged to the flange, as set forth.

3. A barrel-heater having a hinged drum or cylinder provided with a pivoted supporting-leg, in combination with the barrel-supporting flange, substantially as and for the purpose set forth.

4. A barrel-heater having a stationary partition secured to the ash-pit and a removable partition secured in the drum, substantially as and for the purpose set forth.

5. A barrel-heater provided with removable grate-bars, in combination with an ash-pit having vertical partition, and drum having vertical removable partition secured within the heater, as set forth.

6. In a barrel-heater, the combination of fire-box, removable grate-bars, ash-pit provided with stationary partition and air inlet and exit openings, and a drum surrounding the fire-box and being capable of being tilted back, and provided with a pivoted leg, all substantially as and for the purpose set forth.

AUGUSTUS R. HYNSON.

Witnesses:
GEO. H. KNIGHT,
L. S. METCALFE, Jr.